United States Patent [19]
Jacob

[11] 3,986,187
[45] Oct. 12, 1976

[54] AUTOMATIC SIGNAL TRACKING CIRCUIT
[75] Inventor: Don M. Jacob, Los Angeles, Calif.
[73] Assignee: Hughes Aircraft Company, Culver City, Calif.
[22] Filed: Jan. 30, 1956
[21] Appl. No.: 562,163

[52] U.S. Cl. ............................................. 343/7.3
[51] Int. Cl.² ......................................... G01S 9/14
[58] Field of Search ............... 343/7.3; 250/27 GT, 250/27 PS

[56] References Cited
UNITED STATES PATENTS

| | | | |
|---|---|---|---|
| 2,523,283 | 9/1950 | Dickson | 343/7.7 |
| 2,761,130 | 8/1956 | Kibler | 343/7.3 |
| 3,054,102 | 9/1962 | Press et al. | 343/7.3 |
| 3,130,402 | 4/1964 | Kuck | 343/7.3 X |
| 3,713,150 | 1/1973 | Siconolfi | 343/7.3 |

*Primary Examiner*—T.H. Tubbesing
*Attorney, Agent, or Firm*—W. H. MacAllister; Walter J. Adam

EXEMPLARY CLAIM

1. In an automatic target tracking radar system for tracking selected target signals in the presence of interfering signals, a range tracking circuit for automatically tracking selected received video signals, and means for modifying the video signals applied to said range tracking circuit, said means being selectively operable for placing an inverted replica of each received video signal either before or after each of said received signals, said inverted replica effecting the cancellation in said means of any non-inverted signals occurring in time coincidence therewith.

13 Claims, 4 Drawing Figures

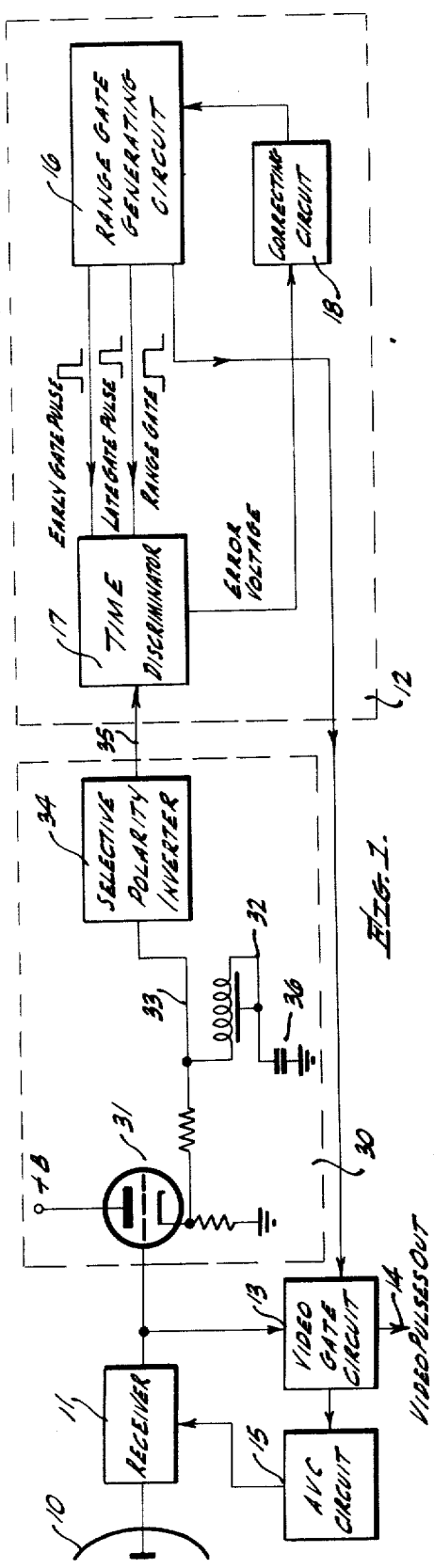
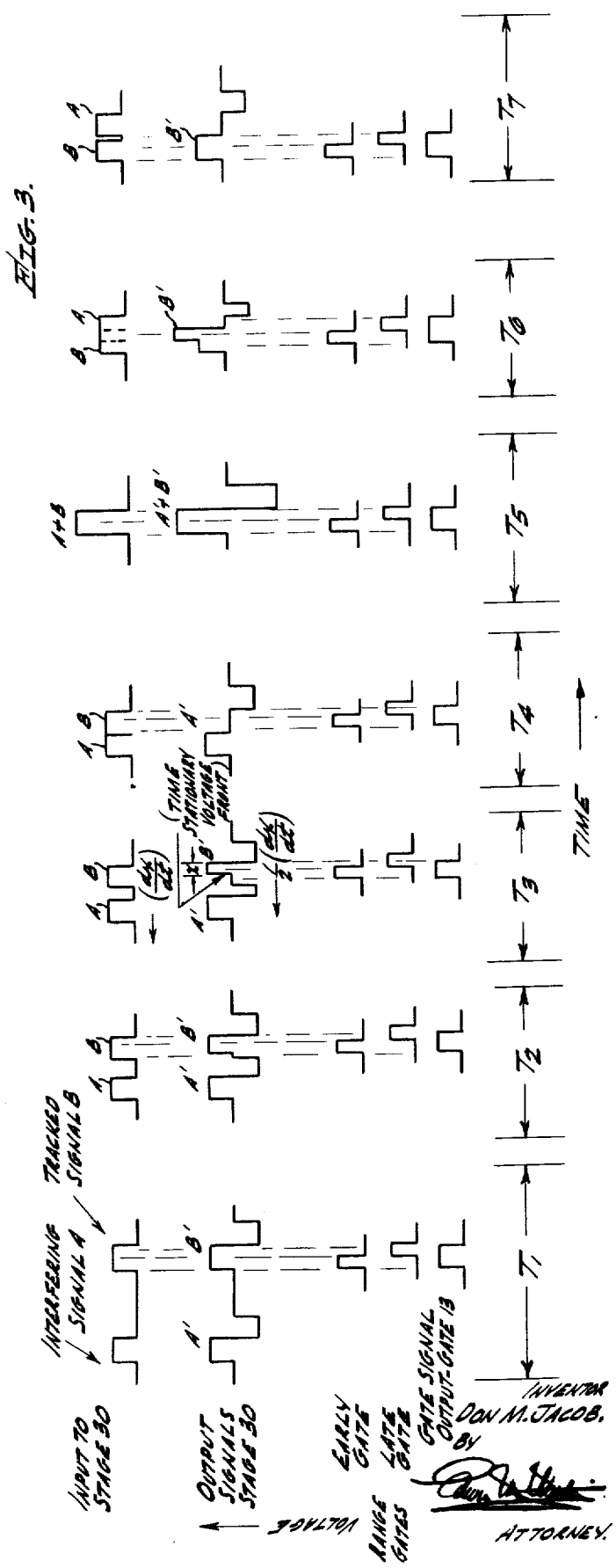

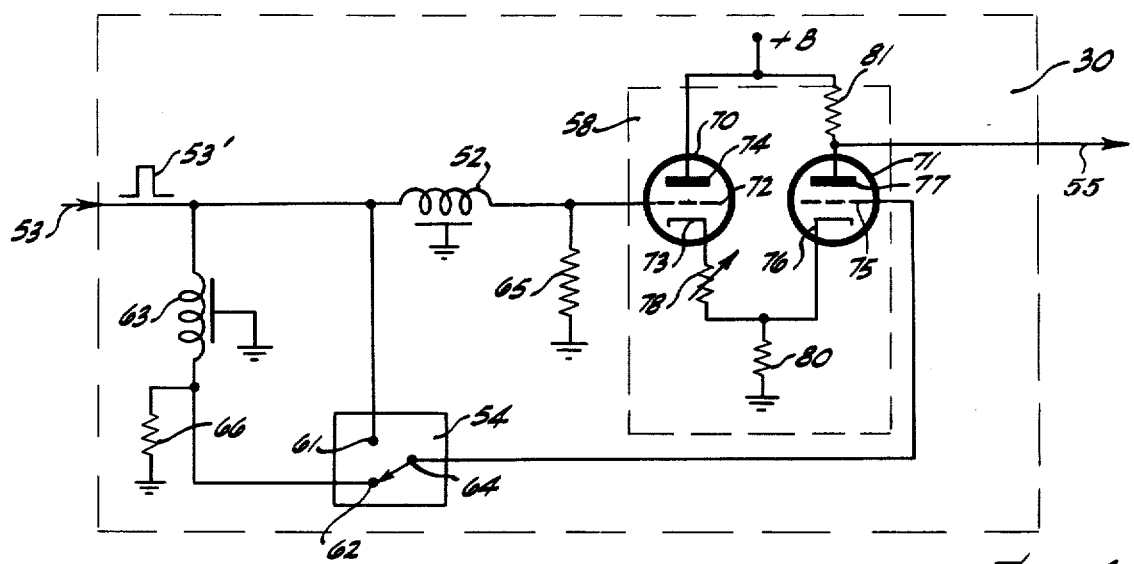
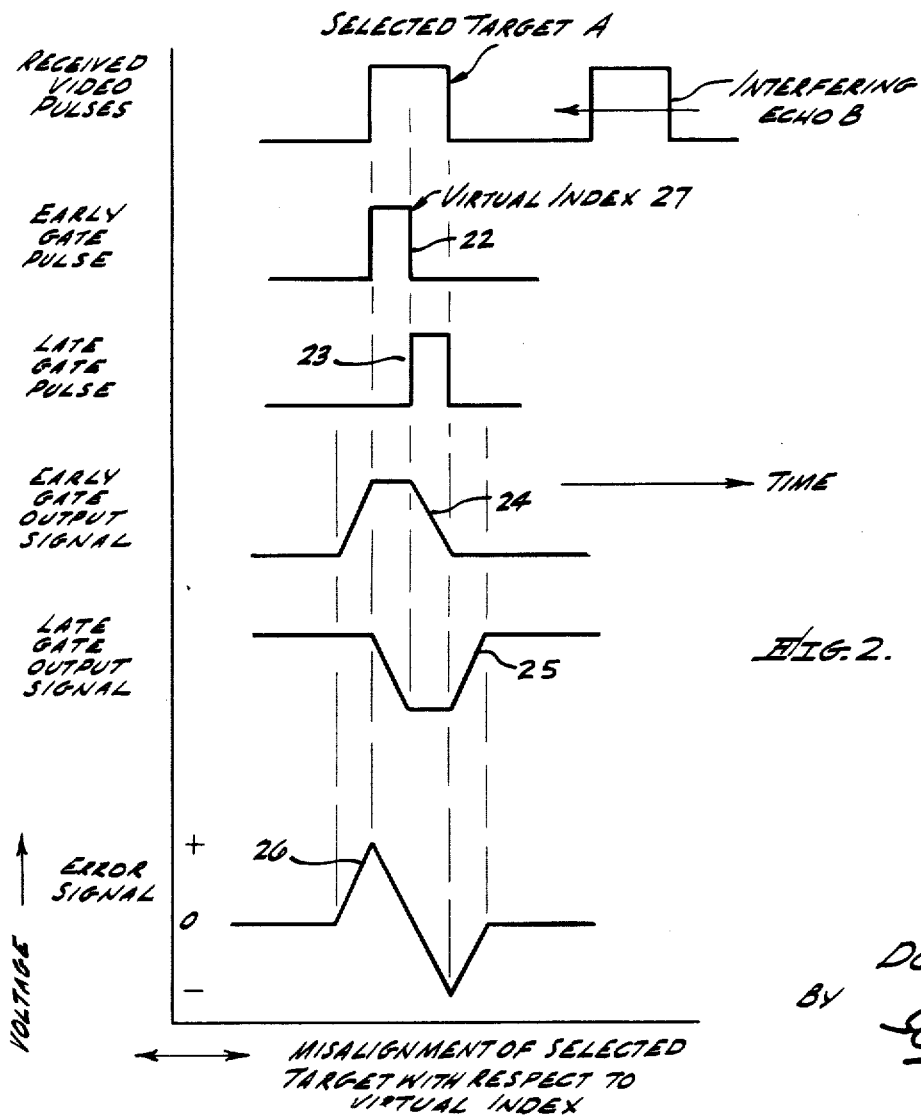
FIG. 4.
FIG. 2.
INVENTOR.
DON M. JACOB,
BY
ATTORNEY.

AUTOMATIC SIGNAL TRACKING CIRCUIT

The present invention relates to target tracking radar systems, and more particularly to an automatic electrical signal tracking circuit for radar receivers for tracking selected target signals in the presence of interference.

Where radar is used to follow the motion of a single object or target, it is advantageous to provide that the receiver be operated only during the periods in which energy from the selected target is being received. Such operation considerably enhances the signal-to-noise ratio of the receiver, and makes possible the use of automatic gain control circuits whose operation is solely a function of the amplitude of the desired target signal.

Ordinarily, these results are achieved by providing a range gating circuit which opens the receiver at the particular moment in time following the transmitter pulse corresponding to the instant of receipt of the echo pulse and closes the receiver immediately thereafter. In synchronous systems the gating signal is timed to occur at an interval of time following the transmitter pulse corresponding to the time required for the transmitter pulse to travel to the target and for the echo signal to return to the receiver. In non-synchronous systems timing is achieved by providing that the gating signal occur at a selected interval of time following the previous gating signal without reference to the time of occurrence of the transmitter pulses. Since the time of receipt of the received echo pulse is a function of the distance between the transmitter and the target and the target and the receiver, variations in either of these distances will produce variations in the time of receipt of the echo pulses. Accordingly, means are generally included in the receiver to indicate changes of the time of occurrence of the echo pulse so that appropriate adjustment may be made in the time of occurrence of the gating signal. While such adjustments may be made manually, the more advanced systems generally incorporate means for adjusting the range gate to automatically track or follow the target as the relative ranges and times of occurrence of the echo pulses change.

Such automatic range tracking circuits generally provide means for detecting whether the echo pulse occurs early in relation to the gate signal or late in relation to the gate signal, the time of occurrence of the gate signal being thereafter adjusted in order to provide that the gate and echo signals be generated at the same time. Once the gate has been adjusted to provide that the target echo occurs at any time during the gate interval, such circuits will operate to bring the gate signal into time coincidence with the echo pulse.

In addition, the range gating circuits of prior art generally include velocity memory circuits to maintain the rate of change of time of the gate signal constant even during the momentary absence of a received echo pulse. Such circuits prevent the loss of a target even if the echo signals momentarily disappear.

On the other hand, the range gating circuits heretofore proposed, and more particularly the automatic electrical tracking circuits for such range gates become notoriously unreliable if an interfering signal or the echoes from a target other than the selected target occur during the gating interval.

While the automatic tracking circuits of the prior art have been specifically designed to inhibit the response of radar receivers to signals occurring at other than the selected instant, such circuits will respond without target discrimination to any interfering signal which occurs during the gate interval. If the undesired target produces an echo which in a time sense passes into a gate tracking on the desired target and then passes out of the gate, there is nothing in the circuits of the prior art to prevent the gate from following the undesired target rather than the desired target as the two echo signals diverge. While the velocity memory circuits of the prior art tend to maintain the gate tracking on the desired target, the velocity information stored during the time in which portions of the signals overlap will indicate a velocity which is a composite of the velocity of the two targets and therefore as the signals diverge the velocity information stored at the instant of divergence does not necessarily correspond to the velocity of either target. The performance of velocity memory circuits in such a situation may be enhanced by providing that the memory not change appreciably during the time of overlap of the target signals, but such provision seriously detracts from the tracking capabilities of the system for a single target, where the velocity of the desired signal is changing rapidly, as for example, in situations in which either the target, transmitter or receiver are accelerating with respect to each other.

It is therefore an object of the present invention to provide an automatic range tracking circuit for use in radar receivers which provides improved tracking in the presence of spurious and undesired signals.

A further object of the present invention is to provide an automatic tracking circuit which displays greatly enhanced discrimination between a number of closely grouped targets.

Still another object of the present invention is to provide an improved automatic ranging circuit which is capable of automatically tracking a desired target signal into and through an interfering target signal.

Yet another object of the present invention is to provide an automatic range tracking circuit which is relatively immune to purposely generated interfering signals.

Still a further object of the present invention is to provide an automatic range tracking circuit having enhanced performance in the presence of undesired target signals which is nonetheless simple, reliable, and readily and cheaply fabricated.

An automatic signal tracking circuit for radar receivers, according to the present invention, comprises a range circuit including means for detecting received echo signals and producing output video pulses corresponding thereto; means for generating video gating signals in substantial time coincidence with a selected one of said output video pulses; detecting means for detecting changes in the time of occurrence of the selected video pulses with respect to said gating signal and producing an output error signal corresponding to the difference in times of occurrence of said gating signal and video pulse; means responsive to said error signal for changing the time of occurrence of said gating signal to reduce said error signal; and video inverting and signal modifying means for modifying the output video pulses applied to said detecting means, said last named means being selectively operable for placing an inverted replica of each output video pulse before or after each of said received signals, said inverted replica effecting the cancellation in said means of any non-inverted video pulses occurring in time coincidence therewith.

The novel features which are believed to be characteristic of the invention, both as to its organization and method of operation, together with further objects and advantages thereof, will be better understood from the following description considered in connection with the accompanying drawings in which a number of embodiments of the invention are illustrated by way of example. It is to be expressly understood, however, that the drawings are for the purpose of illustration and description only, and are not intended as a definition of the limits of the invention.

FIG. 1 is a circuit diagram, partly in block form, of a radar system including an embodiment of the present invention.

FIG. 2 is a chart of waveforms useful in illustrating the response of the system of FIG. 1 with the embodiment of the present invention omitted.

FIG. 3 is a chart of waveforms illustrative of the operation of the system of FIG. 1.

FIG. 4 is a circuit diagram of another embodiment of the present invention.

Referring now to FIG. 1, there is shown a radar receiving system including an embodiment of the present invention comprising a video inverting and signal modifying stage 30. The operation of such a system will first be explained by reference to FIG. 2 wherein there are shown waveforms of signals appearing at various points in the system of FIG. 1 when in operation with stage 30 omitted. As shown in FIG. 1, such a system comprises an antenna 10 for receiving radio-frequency signals including echo and interfering pulses. These signals are applied to a receiver 11 which operates to detect the received signals and produce output pulses of video frequency corresponding to the received signals. The output video pulses from receiver 11 are in turn applied to a range gating circuit indicated by dotted line 12 and to a video gate circuit 13. Range gating circuit 12 operates to apply a gating signal to video gate 13 during the receipt of selected target echos whereby the selected target echos are passed to video pulse output lead 14, and thence to an indicator, for example. The video output pulses from video gate 13 may also be used to control an automatic volume control circuit 15 which operates to control the gain of receiver 11 in response to the amplitude of the desired echo pulse.

Range gating circuit 12 may be mechanized in accordance with a number of well known schemes. A conventional circuit for use in non-synchronous radar receiver systems may include a self-synchronizing range gate generating circuit 16 arranged to produce output gating signals having a time duration corresponding to that of the desired echo signals and to impress these on video gate circuit 13. Since, for moving targets, the time of occurrence of the incoming pulses will tend to vary, some system is ordinarily required to alter the rate at which range gate 16 operates in order to maintain synchronism between the gate and the desired pulses. This result is ordinarily achieved by providing a time discriminator 17 for detecting the error in the timing of range gating pulses from generator 16 relative to the incoming video pulses from receiver 11. Time discriminator 17 accordingly produces an output error voltage which may thereafter be applied through a correcting circuit 18 to range gate generator 16 to alter its rate and correct the error. So long as there is time coincidence between the gate signals and the desired echo pulses, operation of the time discriminator 17 will produce no output error voltage. However, when the times of occurrence of the respective echo and gating pulses differ, as when the incoming echo pulses shift with respect to the gating pulses, an output error signal will be produced and the rate of range gate generating circuit 16 altered accordingly.

A particular disadvantage of the range gating circuits known in the prior art and illustrated in FIG. 1 is the fact that range gating circuit 12 will be responsive to any video pulses occurring during the range gate interval. If an interfering pulse and the desired target signal overlap in time the output of time discriminator 17 will be such as to indicate that the desired echo pulse is undergoing a change in velocity and the range gate generator's rate will be modified accordingly. Ordinarily the response of range gating circuit 12 will be such as to shift the range gate in the direction of maximum pulse height. Where the gated pulses include both desired and undesired signals which overlap in time, the maximum amplitude of the received signal will correspond to the time during which the two signals overlap and accordingly the tendency of the circuit will be to track toward the region of overlap. Thus video gate 13 will pass both desired and undesired signals to output pulse lead 14 and to AVC circuit 15. As will be readily understood such operation is highly undesirable and may easily lead to the confusion of desired and undesired signals in the remaining elements of the system.

The deficiency of the prior art system may be better understood by reference to FIG. 2 which is illustrative of the operation and response of range gating circuit 12 according to a conventional embodiment. Such embodiment may correspond to that shown and described in co-pending application entitled "Time Discriminator", Ser. No. 356,402 filed May 21, 1953, by Jerome E. Jacobs and Ercell Edd St. John, now U.S. Pat. No. 2,814,725.

The time discriminator depicted therein makes use of an early gate and a late gate, each adapted to receive the video pulses to be detected and early and late gating pulses respectively. As shown in FIG. 2, early gating pulse 22 and late gating pulse 23, which are supplied by range gate generating circuit 16, have a time duration substantially corresponding to one-half the time duration of the echo signal and are timed so that the trailing edge of early gating pulse 22 occurs simultaneously with the leading edge of late gating pulse 23, indicated as virtual index line 27. When such signals are applied to the time discriminator of the cited copending application, such as shown at 17 in FIG. 1, each gate operates to produce an output signal which is a function of the time displacement of the target signal with respect to each gating pulse. These output signals have been plotted as waveforms 24 and 25 as a function of the misalignment of the center of the selected target pulse with respect to the virtual index line 27 of the gating pulses. Output signals 24 and 25 are summed in the discriminator to produce an output error signal, depicted as waveform 26, which is again a function of the time displacement of the echo signal with respect to the gating pulses. Thus for target signals occurring earlier in time than the gating pulses, positive error output signals will be produced, while for targets occurring later in time, negative error output signals will be produced.

It will readily be recognized that anything which tends to increase the output of the time discriminator during the early gate interval will cause the discriminator to produce an output signal identical to that produced for target signals occurring earlier in time with respect to the gating signals and that a corresponding response will be produced when the amplitude of signal during the late gating pulse is similarly altered. Such response is indeed to be desired since it is required in order to accomplish the automatic range tracking previously set forth.

On the other hand, if an interfering signal such as signal B depicted in FIG. 2 approaches in a time sense the target signal A being tracked, the time discriminator will begin to produce an output error signal as soon as the two signals begin to overlap. Examination of waveshape 24 of FIG. 2 will show that this error signal will be of a polarity tending to shift the gate pulses in the direction of the interfering signal regardless of the direction from which the interfering signal approaches. If the gating signals applied to video gate 13 are of one pulse duration, according to conventional practice, the interfering signal will immediately be gated to the remaining portions of the circuit as soon as the interfering signal begins to overlap the desired signal. Moreover, if the interfering pulse moves into a partially overlapping relationship with the desired pulse and remains in such relationship for any period of time, the range tracking circuit, having detected an error signal, will operate to reduce the error signal to zero. In so doing the range gates will shift to track on the center of the composite pulse, corresponding to the center of the region of overlap, where the desired and interfering signals are of equal amplitude. Under such conditions it will be readily recognized that the range gating circuit will gate equal portions of the desired and interfering signals to the remaining portions of the receiver, resulting in the confusion of targets.

The present invention operates to overcome the above and other disadvantages of the prior art by providing that the time relationship between the gate signal and the tracked echo signal is automatically shifted as an interfering signal approaches so that the gate tracks on portions of the desired echo signal which are removed in a time sense from the interfering signal. The operation of the present invention to achieve such performance may be better understood by now considering the specific circuit details of one embodiment of the present invention.

As shown in FIG. 1, a radar receiver system, including an embodiment of the present invention, comprises all of the elements of the radar system previously described, and in addition, a video inverting and signal modifying stage 30 for carrying out the signal modification and inversion called for by the present invention. Video stage 30 is arranged to receive video input pulses from radar receiver 11 and produce an output signal for application to range gating circuit 12 which includes, in addition to the video pulses from the receiver, additional inverted signals corresponding thereto which occur either immediately before or after the received video signals. The circuit is additionally arranged to effect cancellation of overlapping signals of opposite polarity thus generated.

As shown in FIG. 1, video stage 30 comprises a cathode follower stage 31 for receiving the applied input signals and supplying an output signal to output lead 35 through a selective polarity inverter 34 by means of a conductive lead 33. Polarity inverter 34 may be any convenient means for selectively inverting or directly connecting the signals received on lead 33 to output lead 35. A delay line 32 having its terminating end short circuited to signal pulses is connected between lead 33 and ground by means of a capacitor 36 to prevent short-circuiting signal pulses on lead 33 to ground. Output lead 35, following the arrangement depicted in FIG. 1, is arranged to supply its signals to range gating circuit 12 which includes a range gate generating circuit 16 and time discriminator 17, which may be mechanized in accordance with the circuit previously described. In the description which follows it will be assumed that range tracking circuit 12 is arranged to respond to signals of positive polarity supplied on lead 35, but it should be understood that the circuits may as readily be mechanized to respond to negative pulses if appropriate changes are made.

Considering now the response of the circuit thus described to applied input signals, positive pulses applied to the input of cathode follower stage 31 will appear with positive polarity at the output of the stage on lead 33. If delay line 32 is arranged to have a delay corresponding in time to one-half pulse width time of the desired echo signals, positive pulses applied to the line will be reflected with opposite polarity and a delay of one pulse time. Thus, each positive pulse applied to stage 31 will appear at the input of polarity inverter 34 as a positive pulse followed by a negative pulse of substantially the same time duration. Polarity inverter 34 may be utilized to invert this pulse waveform, if desired, in which case the output signals from the circuit will comprise a negative pulse signal followed by a positive pulse signal. The negative pulse signal will hereafter be referred to as a "hole" and it will thus be seen that the effect of polarity inverter 34 is to provide that the hole occur either in front of or in back of each positive going video pulse. In cases where the negative hole is immediately in front of each positive pulse, the positive pulse will actually be one pulse width time delayed with respect to the positive pulses received by stage 30.

Where two positive pulses occurring less than one pulse width time apart are received by stage 30, the output signals from the stage will be of a form representing the composite summation of the original positive pulses and the negative holes produced by the delay line. In other words, the negative hole following the leading pulse will effect cancellation of the positive portions of the trailing pulse with which it overlaps. Such response may be considered to be an obvious extension of the superposition principle to stage 30 under the assumption that the stage operates in a linear manner. The usefulness of this effect in carrying out the purpose of the present invention will be understood more fully following the description of FIG. 3 where various voltage waveforms are plotted as a function of time. It is to be noted again that range gating circuit 12 should be arranged to track on positive pulses only regardless of the position of polarity inverter 34.

The operation of video inverting and signal modifying stage 30, according to the present invention, may be best illustrated by considering FIG. 3 which depicts waveforms present in the system in operation. The waveforms represent typical pulse patterns occurring during successive intervals of time, it being understood that the pulse patterns shown are depicted along a discontinuous horizontal time axis, it being understood that the performance described would actually occur in response to a much greater number of pulses than those shown. Video signals A and B, impressed on stage 30, as shown in FIG. 3, will appear at the output of stage 30 as signals A' and B', each positive input signal being followed by a hole of corresponding duration if polarity inverter 34 is switched to its non-inverting position. If it is assumed that the circuit is arranged by means heretofore described to track on signal B' as the selected target, the presence of signal A (and signal A') representing an interfering signal will not affect the tracking action in any manner so long as signal A remains greater than one pulse width time away from pulse B, as during time interval $T_1$. If pulse B now approaches to within one pulse time of signal A, the leading edge of pulse B' will be cancelled by negative portions of pulse A', thus decreasing the time width of pulse B'. In accordance with the response previously postulated, the range gate will track the center of voltage of the remaining pulse above the base line and thus will shift with respect to the original video pulse B, as shown during time interval $T_2$.

As pulse B continues to move toward pulse A and pulse B' toward pulse A', the hole following pulse A' in effect serves to maintain the leading edge of pulse B' stationary and one pulse width time removed from pulse A'. At the same time the trailing edge of the positive portions of pulse B' will continue to move with the target. As will be seen during time interval $T_3$, the center of the positive portions of pulse B', not cancelled by the hole, will always remain more than one pulse width from pulse A' and accordingly the center line of the gates will remain at least one pulse time away from pulse A. During all this time, however, video gate 13, which receives as input signals video pulses A and B and a range gating signal having a width equal to the early and late gating pulses taken together, will continue to gate portions of pulse B to its output lead 14.

The effect of the signal cancellation described on the relative velocities of the gate and target signals where a tracked target approaches an interfering signal is also shown during interval $T_3$. If target signal B is assumed to have an initial velocity of $(dx/dt)$, the velocity of the center of pulse B' on which the gates are tracking will be one-half $(dx/dt)$ where pulses A and B are of equal amplitude. Therefore, as soon as pulse B' enters the hole of the A' pulse, the range gate velocity will become one-half the velocity of pulse B with respect to pulse A. If pulses A and B are of unequal amplitude the shift in range velocity will be a function of their relative amplitudes. This shift in velocity is merely another way of stating that the gate signals in tracking the desired signal shift in the presence of an undesired signal to portions of the desired signal remote in a time sense from the undesired signal, the shift being accomplished by a decrease in the velocity of the gate signal.

At the instant the leading edge of pulse B moves into coincidence with the trailing edge of pulse A, as shown for time interval $T_4$, the positive portion of pulse B' will be completely cancelled and disappear from the gate, which meanwhile will have shifted to track on the portion of pulse B', corresponding to the trailing edge of pulse B. Since the early and late gate signals are no longer supplying information to the time discriminator further error signals will not be developed in the range gating circuit unless use is made of a velocity memory circuit. On the other hand, the composite pulse being fed to video gate 13 will continue to feed portions of pulse B to output lead 14 since portions of the gate signal do overlap signal B.

If use is made of a velocity memory circuit in the range tracking circuit the velocity of the gate signal will be maintained at one-half the velocity of pulse B, and it may easily be shown that signals will not again be gated to the range tracking circuit until pulse A' and pulse B' are in substantial time coincidence, as shown for interval $T_5$. During all this time, however, at least a portion of pulse B will continue to be gated through video gate 13.

Similarly, if signal B continues to travel with the same velocity relative to signal A, the hole following B' will now tend to cancel the leading edge of pulse A' as shown for time interval $T_6$, and the gate signal will continue to track on the center of the composite pulse. As the pulses continue to diverge (interval $T_7$), pulse A' will move into the hole following pulse B' and be completely cancelled when the trailing edge of pulse B and the leading edge of pulse A are in substantial time coincidence. Since pulse B' is the only pulse being applied to the range gating circuit at such time, and a portion of the gate signal is already tracking on pulse B', the gate signal will move into time coincidence with pulse B' and continue to track on pulse B' as before. It may be shown that for equal amplitudes of signal pulses A and B the gate will tend to move with a velocity 1½ times the velocity of pulse B with respect to pulse A as the signals diverge, thus insuring that the pulse will follow the proper target.

It will thus be seen that the effect of incorporating the circuit of the present invention to a conventional range gating circuit is to make it possible to track a pulse into almost simultaneous time coincidence with an interfering pulse without introducing any portion of the interfering pulse into the video gate of the receiver, while portions of the desired signal will continue to be gated into the video circuits. If the desired pulse moves through an interfering pulse the range gating circuit of the present invention will continue to track on the desired pulse regardless of the relative relocity of the two pulses. This tracking action will be maintained where the desired pulse is greater than the interfering pulse, equal to the interfering pulse or even 6 d.b. less than the interfering pulses. The operation of the circuit will be determined to a certain extent by the relative magnitudes of the two pulses but may be compensated for by the use of an amplified hole utilizing the embodiment of FIG. 4 which will be described hereinafter.

If, in the above example, the range gate were originally tracking on pulse A as the desired pulse and pulse B is now considered to represent the interfering pulse, it will be seen that the use of a hole following each pulse in the manner described will not improve the tracking capabilities in the manner described, since the hole behind the signal (in point of time) will not tend to subtract from the composite signal formed within the gate. In such a situation use may be made of polarity inverter 34 to invert signals A' and B', in which case each positive pulse will be preceded in time rather than followed by a negative going signal. When operated in this manner the output of the inverted video circuit will correspond to a mirror image about the time axis of the waveforms shown in FIG. 3. Since the gate continues to track on positive portions of the pulse, the pulse narrowing effect and corresponding shifting in the range gate heretofore postulated will now take place with respect to pulse A and the improved tracking capabilities of the present system will be maintained, assuming the system is originally tracking pulse A (and A'). Ordinarily, adjustment of polarity inverter 34 may conveniently be made in accordance with previously available information as to target and interference conditions. It will be recognized that the range gate signal with the hole placed in front of the target signal will be one pulse width time displaced with respect to the true time position of the received echo pulse. On the other hand, since a non-synchronous system, as previously defined, cannot afford absolute range information, the addition of a constant time displacement to the pulse tracked will not interfere with the accuracy of the relative information supplied in any manner.

Where the interfering signal is more than 6 d.b. greater than the desired signal the embodiment of the present invention shown in FIG. 1 will not operate in the manner described, since the hole following or in front of the desired signal will be of insufficient amplitude to accomplish the signal cancellation desired. Where such an amplitude relationship exists use may be made of the embodiment of the invention shown in FIG. 4, which provides means for increasing the amplitude of the hole in a negative direction in order to effect the desired cancellation. As shown in FIG. 4, an embodiment of the video inverting and signal modifying circuit of the present invention including means for amplifying the portions of the input signal inverted, generally designated by the numeral 30, includes an input lead 53 for receiving positive going input signals from a source of video signals such as receiver 11 and applying the signals through a delay line 52 to one input of a differential amplifier stage 58 having two inputs. The input signals received on lead 53 are also supplied directly to a contact point 61 of a single-pole double-throw switch 54 and to the other contact 62 of the switch through a second delay line 63. Switch 54, as will be explained more fully hereinafter, performs essentially the same function as selective polarity inverter 34. The pole 64 of switch 54 is connected to the second input of differential amplifier 58. Amplifier 58 is arranged to receive input signals from delay line 52 and switch 54 and produce in response thereto, a signal on output lead 55 which is a function of the difference in amplitude between its received input signals. More particularly, differential amplifier stage 58 comprises a pair of triodes 70 and 71, each having a grid, cathode, and plate numbered 72, 73, 74, and 75, 76, 77, respectively. Grids 72 and 75 are respectively connected to the output of delay line 52, and pole 64 of switch 54. In addition a resistor 65 is connected between grid 72 and ground, and another resistor 66 between switch contact 62 and ground to serve as terminating loads for delay lines 52 and 63. Plate 74 of triode 70 is connected directly to a source of positive voltage +B, while plate 77 is connected to source +B through a load resistor 81. Cathode 73 is connected to ground through a variable resistor 78 and a fixed resistor 80, the resistors being connected in series, while cathode 76 is connected directly to the point of interconnection of resistor 78 and resistor 80. Output lead 55 is connected to plate 77.

Ordinarily, delay line 52 preferably will be selected to have a delay substantially corresponding to a delay of one pulse width while delay line 63 will be selected to have a delay corresponding to two pulse widths in time. When the delays of the delay lines are adjusted in this manner, the output pulses appearing on output lead 55 will correspond in shape to those shown in FIG. 3 and described in connection with the embodiment of the invention of FIG. 1. However, the amplitude of the positive going parts of each pulse may be adjusted by means of adjustable resistor 78 to have any desired relationship to the input signal pulses.

Considering now the response of the circuit thus described to applied input pulses such as, for example, input pulse 53', a pulse of corresponding shape but delayed one pulse width in time will appear on the output of delay line 52 and be applied to the input of triode stage 70. Triode stage 70 will be seen to be arranged to a cathode follower and accordingly, a signal of corresponding polarity will appear on its cathode 73 and at the junction of resistors 78 and 80. The amplitude of the pulse appearing at the junction point, however, is a function of the setting of variable resistor 78, the pulse substantially corresponding in amplitude to the applied input pulse for a zero resistance setting of resistor 78 and being a small fraction of the applied input pulse when variable resistor 78 is adjusted to be much greater than resistor 80. This signal in turn is applied directly to the cathode of triode 71, which will respond to produce a signal of corresponding polarity on output lead 55. Stage 71 will be seen to be arranged as a conventional amplifier stage with both its grid and cathode serving as inputs. If the value of resistor 81 is so selected that the gain of the stage with respect to signals applied to its grid is greater than unity, the stage will also have a slightly larger gain with respect to signals applied to its cathode. Resistor 78 may conveniently be adjusted to compensate for this gain by reducing the amplitude of the signal applied to the cathode of stage 71 so that the amplitude of signals appearing on output lead 55 in response to signals applied to the input of stage 70 substantially corresponds to the applied input signals. Accordingly, the output signal appearing on lead 55 due to signals applied to grid 72 will be seen to have the same polarity as the applied input signals, be delayed one pulse width in time with respect to them, and have an amplitude substantially corresponding to that of the applied input signals.

On the other hand, the signal applied to grid 75 of stage 71 will be a function of the setting of switch 54. With the switch contacting contact 61 input pulse 53' will be applied directly to the grid input and a signal corresponding thereto but inverted and amplified will appear on output lead 55. This signal will appear one pulse width time prior to the positive signal produced by the signal applied to grid 72, and accordingly, the output composite signal will be seen to comprise a negative signal followed by a positive signal, the negative signal having a greater amplitude than the positive signal. With switch arm 64 contacting contact 62 the signal applied to grid 75 will be delayed two pulse widths in time due to delay line 63. This signal will similarly appear as a negative signal on output lead 55, but since it has been delayed twice as long as the positive going pulse will appear to follow the positive pulse on output lead 55. It will thus be seen that switch 52 may be used to place the negative going pulse either before or after positive input signal pulses.

If it is assumed that the elements of the embodiment of FIG. 4 are substantially linear, the response of the system to approaching and receding interfering pulses will correspond substantially to that of the embodiment of FIG. 1. Since the gain of stage 71 may be designed to provide that the hole associated with the desired signal be of any amplitude, substantially complete cancellation of interfering pulses of any amplitude may be achieved. When properly designed in this manner, operation of the circuit will correspond almost identically with that of the embodiment of FIG. 3.

The embodiment of FIG. 4 for either position of switch 52 will introduce a fixed delay in the output signals with respect to applied input signals. Where non-synchronous systems are utilized, however, such fixed delay will not detract from the performance of the system. When utilized in synchronous systems, appropriate compensation in range information may be introduced where it is desired to obtain an absolute indication of range.

While the operation of the present invention has been particularly described with respect to interfering pulses, it should be understood that the target discrimination capabilities of the present invention are not limited to pulse-type interfering signals, but will be similarly operative in the face of any interfering signals, as may be caused, for example, by other interference generating disturbances.

What is claimed as new is:

1. In an automatic target tracking radar system for tracking selected target signals in the presence of interfering signals, a range tracking circuit for automatically tracking selected received video signals, and means for modifying the video signals applied to said range tracking circuit, said means being selectively operable for placing an inverted replica of each received video signal either before or after each of said received signals, said inverted replica effecting the cancellation in said means of any non-inverted signals occurring in time coincidence therewith.

2. The means defined in claim 1, including means for amplifying said inverted replicas.

3. In an automatic target tracking radar pulse echo detecting system, including a range circuit comprising means for generating a gating signal in substantial time coincidence with a selected target echo signal, detecting means responsive to said selected target signal and said gating signal for detecting changes in the time of occurrence of said selected target signal with respect to said gating signal and producing an error signal corresponding to the difference in times of occurrence of said signals, and means responsive to said error signal for changing the time of occurrence of said gating signal in such manner as to reduce said error signal, the combination comprising a video inverting and signal modifying stage coupled to the input of said detecting means for modifying the target echo signals applied to said detecting means to include an inverted replica of each received input signal immediately following said signal, and means selectively operable for applying the modified signals either directly or with reversed polarity to said detecting means.

4. In an automatic target tracking radar system, a range tracking circuit normally adapted for automatically tracking the voltage center of selected received video signals of a preselected polarity, and means for modifying the video signals applied to said range tracking circuit to include an inverted replica of each received video signal immediately after the occurrence of each of said signals, said inverted replica effecting the cancellation in said means of any non-inverted signals occurring in time coincidence therewith.

5. In an automatic target tracking radar system, a range tracking circuit normally adapted for automatically tracking selected received video signals of a first polarity, means for modifying the video signals applied to said range tracking circuit, including means for delaying video pulses of said first polarity and applying said delayed video pulses to said range tracking circuit, and means for applying undelayed pulses of a second polarity corresponding to said pulses of said first polarity to said range tracking circuit.

6. In an automatic target tracking radar system, a range tracking circuit normally adapted for automatically tracking the voltage center of selected received video signals, means for reducing the width of said tracked video signals in the presence of interfering signals, said means being responsive to said interfering signals for shifting the voltage center of said selected pulse in a time sense away from said interfering signals.

7. In an automatic target tracking radar system, a range tracking circuit normally adapted for automatically tracking the voltage center of selected received video signals of a preselected polarity; a video inverting and signal modifying stage comprising a delay line having its output end directly short circuited to video pulses; means for applying received video signals to the input of said delay line; and means for interconnecting the input of said delay line and the input of said range tracking circuit.

8. The video inverting and signal modifying stage defined in claim 7, wherein said last named means is selectively operable for directly connecting the input of said line to the input of said range tracking circuit or for inverting the signals appearing at the input of said delay line prior to their application to the input of said range tracking circuit.

9. The video inverting stage defined in claim 8, wherein said delay line has a delay corresponding to one-half the time duration of said selected received video signals.

10. In an automatic target tracking radar system, a range tracking circuit for automatically tracking selected received video signals; a video inverting and signal modifying stage comprising a differential amplifier having first and second input terminals and being responsive to signals applied thereto for producing an output signal corresponding to the difference between said signals; means for applying video pulses from a video receiver to said first input terminal, said means comprising a first delay line; and means for applying video pulses from the video receiver to said second input terminal, said last named means being selectively operable for applying said signals either directly or after delay.

11. The video inverting and signal modifying stage set forth in claim 10, wherein said first delay line has a delay corresponding to the time width of selected target video signals, and said selectively operable means is operable to delay said selected target signals more than one pulse width time.

12. A video inverting and signal modifying stage for interconnecting a radar receiver and an automatic range tracking circuit normally adapted for automatically tracking the center of selected target signals, said stage comprising: a differential amplifier having first and second input terminals and an output terminal, and being responsive to signals applied to said first and second input terminals for producing an output signal corresponding to the voltage difference of signals applied to said input terminals; first means comprising a first delay line for interconnecting said first input terminal and the output terminal of the radar receiver; second means including a switch and a second delay line for interconnecting said second input terminal and the output of the radar receiver, said switch being selectively operable for connecting said second input terminal directly to the output of the video receiver or for connecting said second input terminal through said second delay line to the output of the video receiver; and means for connecting the output of said differential amplifier to the automatic range tracking circuit.

13. The video inverting and signal modifying stage set forth in claim 12, wherein said first delay line has a delay corresponding to the time width of selected video signals, and said second delay line has a delay corresponding to twice the time width of selected video signals.

* * * * *